United States Patent [19]

Clark

[11] 4,371,139
[45] Feb. 1, 1983

[54] ADJUSTABLE MOUNTING RACK FOR SOLAR COLLECTORS

[75] Inventor: Peter D. Clark, East Berlin, Conn.

[73] Assignee: Sunsearch, Inc., Guilford, Conn.

[21] Appl. No.: 108,942

[22] Filed: Dec. 31, 1979

[51] Int. Cl.³ .................. A47G 29/02; E04G 3/08; E06G 7/28
[52] U.S. Cl. .................................................. 248/237
[58] Field of Search ............... 248/237, 148, 201, 536, 248/441 B, 455; 52/27, 29; 126/424; 182/45, 178

[56] References Cited

U.S. PATENT DOCUMENTS

| | | | |
|---|---|---|---|
| 4,074,883 | 2/1978 | Daly | 248/201 X |
| 4,165,853 | 8/1979 | Brandt | 248/237 |
| 4,169,712 | 10/1972 | Boyce et al. | 126/424 |
| 4,269,173 | 5/1981 | Kruegur et al. | 126/417 |

FOREIGN PATENT DOCUMENTS

| | | | |
|---|---|---|---|
| 2404815 | 6/1979 | France | 126/424 |
| 2418488 | 10/1979 | France | 126/424 |

*Primary Examiner*—Ronald Feldbaum
*Attorney, Agent, or Firm*—Costas, Montgomery & Dorman

[57] ABSTRACT

A rack for supportively mounting a solar collector to a mounting surface to set the angle of tilt with respect to the sun. One end of the rack is adapted to provide predominant support of the collector, while the other end is height adjustable to provide the proper angle and to accept tension and/or compression due to wind leading.

10 Claims, 8 Drawing Figures

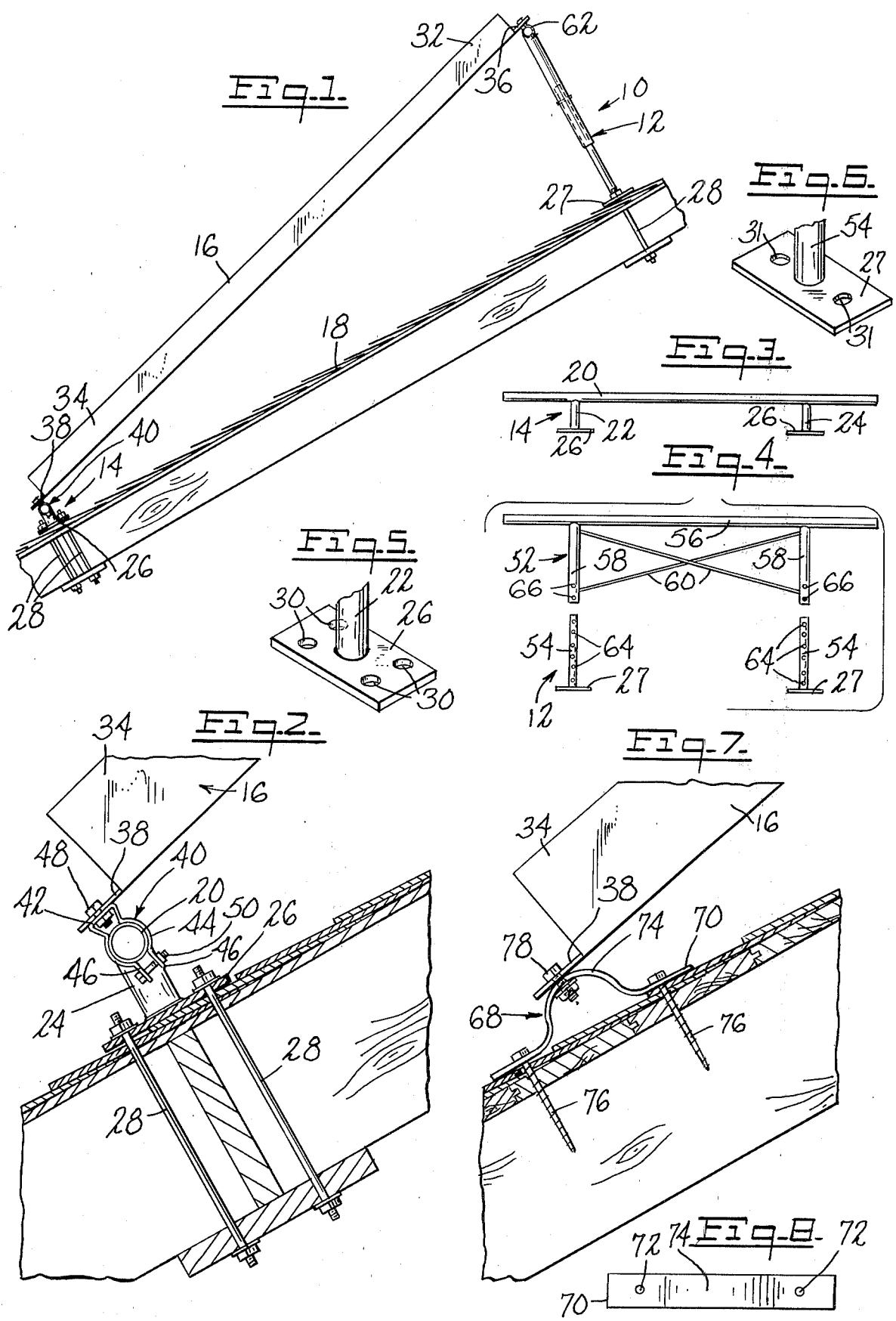

ADJUSTABLE MOUNTING RACK FOR SOLAR COLLECTORS

BACKGROUND OF THE INVENTION

This invention relates to mounting racks for solar collectors and more particularly to an adjustable rack for mounting solar collectors to any type of surface.

Known prior mounting racks do not provide selective adjustment of the angle of the solar collector and hence, do not allow for selective adjustment to attain the recommended tilt of the solar collector. Furthermore, known prior devices do not provide such adjustability in combination with a strong wind resistant stable support configuration.

SUMMARY OF THE INVENTION

The present invention provides a new and improved support rack for a solar collector and includes first and second support elements to which opposite ends of a solar collector are secured. The support elements have legs which extend essentially perpendicular from a support surface. The length of the legs on one support element may be variable in length to present the collector at a predetermined tilt to the direction of the sun, and may be used to increase or decrease the tilt of a collector with respect to the support surface. The legs of one support element carry only loads directed axially thereof and bending loads resulting from lateral wind loads, while the legs of the other support element carry essentially all of the moment generated by wind loads and the weight of the collector.

Extending between spaced apart legs of each support element is a tubular member or rod to which one end of the collector is selectively rotatable, but fixedly connected. The legs extend from mounting flanges which are secured to the support surface. The connection of the flanges of one support element are such as to react moments due to the weight of the collector and wind loading thereon, while the connection of the flanges of the other support element reacts lateral wind loading and axial loads.

An alternate embodiment of the lower support element comprises a mounting bracket secured to the roof and having an arcuate surface in supportive engagement with the lower portion of the solar collector.

An object of this invention is to provide a new and improved mounting rack for solar collectors that allows selective variance of the angle of the collector to obtain optimum collector tilt.

A further object of the invention is to provide a new and improved adjustable mounting rack for solar collectors that provides stable, wind-resistant support for a solar collector.

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings, in which:

FIG. 1 is an elevated sectional side view of the invention mounted to a pitched roof and supporting a solar collector;

FIG. 2 is an enlarged sectional view of the lower portion of the device of FIG. 1;

FIG. 3 is a front elevational view of the lower support element of this device;

FIG. 4 is a partially exploded front elevational view of the upper support element of this device;

FIG. 5 is an enlarged perspective view of a roof mounting flange;

FIG. 6 is a view similar to FIG. 5 of another roof mounting flange;

FIG. 7 is an enlarged sectional side view of an alternate embodiment; and

FIG. 8 is a top view of the alternate embodiment of FIG. 7.

DESCRIPTION OF THE PREFERRED EMBODIMENT

A mounting rack of this invention is generally designated by the numeral 10 and is comprised of an upper support assembly 12 and a lower support assembly 14. Mounting rack 10 is shown supporting a solar collector 16 to a pitched roof 18 of a building in FIG. 1.

A support assembly or element 14 comprises an elongated tubular member or rod 20 having a pair of spaced-apart legs 22 and 24 extending orthogonally therefrom (FIG. 3) and each terminating in a roof mounting flange 26. Flange 26 has four bolt receiving apertures symmetrically arranged about leg 22 as shown in FIG. 5. This arrangement reacts any moment exerted on the collector.

Support assembly 14 is generally oriented with respect to a pitched roof but other orientation may be used such that elongated member 20 is traverse to the pitch of the roof 18. Bolt fasteners 28 extend through apertures 30 of roof mounting flange 26 to a plate 31 bridging a rafter R and securely attach support assembly 14 to roof 18 as shown in FIG. 1. Other types of fastener means may be utilized for securing flange 26 to roof 18, e.g., lag screws.

Solar collector 16 is a conventional-type collector with ends 32 and 34. End flange members 36 and 38 extend outwardly from ends 32 and 34, respectively. Either can be upper or lower. As seen in FIG. 2, lower end 34 is oriented in a generally parallel relationship to elongated member 20 with a mounting clamp 40 interconnecting flange 38 to tubular member 20.

Mounting clamp 40 has an outwardly disposed flat portion 42, a circular shaped middle portion 44, and a pair of compression tabs 46. Flat portion 42 engages flange member 38 and is securely attached thereto by bolt fastener 48. Circular middle portion 44 is more or less rotatably positionable and mounted about member 20 to allow selective rotative movement of solar collector 16 about member 20 upon installation. Bolt fastener 50 connects compression tabs 46 to allow selective securement of mounting clamp 40 to elongated member 20 in a fixed position (FIG. 2).

A second support assembly or element 12 comprises an upper frame 52 and a pair of lower mounting legs 54 (FIG. 4). Each leg 54 has a mounting flange 27 at the end thereof for securement to roof 18 or other support surface by bolt fasteners 27 or any other conventional securement means. Roof mounting flanges 27 have two bolt receiving apertures 31 in alignment with leg 54 as shown in FIG. 6. Upon attachment to a roof, apertures 31 are in alignment with frame member 56 to take up the various moment forces produced by lateral wind loading, etc.

Upper frame 52 includes an elongated tubular member or rod 56, a pair of spaced-apart sleeve members 58 extending perpendicularly from tubular member 56, and cross bar braces 60 connecting sleeve members 58 for added stability (FIG. 4).

Member 56 supports end flange 36 of the collector upper end 32 by a mounting clamp 62 in a manner similar to the connection of flange member 38 to member 20. Member 56 is generally oriented in a parallel relationship with upper portion 32 of solar collector 16.

Legs 54 are mounted to roof 18 to telescopically receive sleeve members 58. Legs 54 contain a plurality of vertically spaced-apart bolt or pin receiving apertures 64 thereto and, in a similar fashion, sleeve members 58 contain a plurality of bolt or pin receiving apertures 66 therethrough. Selective alignment of one of the pin receiving apertures 64 with one of the pin receiving apertures 66 and insertion therethrough of a pin or stop means allows the leg 54-sleeve member 58 combination to be length adjustable for selective adjustment of the linear distance between elongated frame element 56 and the roof mounting flanges 27 of mounting legs 54 (FIGS. 1 and 4). Thus, the distance between upper portion 32 of solar collector 16 and roof 18 may be selectively varied to vary the angle of solar collector 16 with respect to roof 18 or other support surface to allow optimal angular tilt of the solar collector with respect to the sun. The selective rotative connection of lower portion 34 to lower support assembly 14 complements the length adjustability of upper support assembly 12.

Legs 54 and sleeve members 58 are perpendicular with respect to roof 18 or any other support surface to provide a strong stable configuration for upper support assembly 12 in order to withstand wind loading on either side of the collector. The apertures 30 are symmetrically orientated about frame member 20 to provide stability and secure attachment to the roof.

To install the rack, the lower support element is located on the roof and the lower end 34 of the collector with clamps 40 thereon is snapped in place. The collector is tilted to the proper angle, and the clamps 40 and upper end 32 are snapped on rod 56. The upper mounting element which has been set to length for the desired angle is then rotated until legs 54 are perpendicular to the roof. The flanges 27 are then secured to the roof. Bolts 50 are then placed through tabs 46 and nuts tightened to secure the collector to the rack.

An alternate embodiment to lower support assembly 14 is shown in FIG. 7 and is generally designated by the numeral 68. Lower support elements 68 comprise a bracket 70 having screw apertures 72 at each end portion and a middle portion having an arcuate median portion 74 as shown in FIG. 8. The screw apertures are drilled in the end flange 38 and bracket 70 in accordance with the tilt of the collector.

Bracket 74 is attached to roof 18 as shown by means of lag screws 76 extending through apertures 72 and into a rafter. After the desired orientation of solar collector 16 with respect to roof 18 is determined, a hole is drilled in arcuate portion 74 at the proper location and flange 38 is attached to arcuate portion 74 by bolt fastener 78. The arcuate portion 74 supportively engages flange 38 regardless of the relative angle between solar collector 16 and roof 18 and thus provides proper angular mounting of lower portion 34. The upper support element 12 is then attached as previously described.

Where a large number of racks are to be used in a known installation, the legs of the taller support assembly may be fixed in length.

Sealants are used where necessary to seal about all roof fasteners.

Mounting racks 10 provide an adjustable solar collector support that can be utilized on either flat roofs, pitched roofs or other support to attain the desired tilt of the solar collector 16 corresponding to the particular latitude of installation and the particular heating application of the collector. When utilizing rack 10 to mount a collector to an essentially vertical surface, support assembly 14 with flanges 26 is positioned at a higher elevation on the vertical surface while support assembly 12 and flange 22 are positioned at a lower elevation.

For example, the recommended tilt of the collector with respect to the horizontal when the collector is being utilized for heating domestic hot water is an angle equal to the latitude of the particular geographic location. When used for space heating, the angle is generally that of the latitude of installation plus a stated number of degrees. By adjusting the linear distance between the upper portion of the solar collector and the roof, the required angle can be easily obtained. The length-adjustable mounting legs 54 allow for quick and easy adjustment on the roof.

The mounting rack 10 is of durable construction that is economical to manufacture and is quickly and easily assembled on site with very basic tools. Support angle adjustment is quickly and accurately accomplished.

While a preferred embodiment of the invention has been described, alternate embodiments, as well as other embodiments of the invention, may occur to those skilled in the art. Accordingly, the appended claims are intended to encompass all modifications and embodiments of the invention which do not depart from the spirit and scope of the invention.

What I claim is:

1. In combination with a solar collector and a support surface therefor, a rack for mounting the collector at an angle to the horizontal to receive solar radiation, said rack comprising first and second independent support assemblies, said first support assembly having a first pair of spaced apart leg members with a first support member extending between the upper ends thereof, said leg members having flange members rigidly connected on the lower ends thereof for attaching said leg members to the support surface essentially perpendicular thereto and in fixed relation therewith, said leg members including means for varying the length thereof, said second support assembly comprising a second pair of spaced apart leg members with second elongated support member extending therebetween, flange members rigidly connected on the lower ends of said second leg members for attaching said second legs to the support surface essentially perpendicular to the support surface and in fixed relation therewith, said first and second support assemblies, being spaced apart with said support members in essentially parallel relationship, and means secured to said collector adjacent opposite ends thereof and rotatably connected to each of said support members.

2. The rack of claim 1 wherein each of said leg members of said first assembly comprise first and second elongated sections with said first elongated section slidably receiving said second elongated section and means for selectively securing said first elongated section to said second elongated section to vary the height of said first support member.

3. The rack of claim 2 wherein said means for selectively securing comprises a plurality of apertures through said first elongated section, a plurality of apertures through said second elongated section, and stop means for insertion through respective aligned apertures of said first and second elongated sections.

4. The rack of claim 1 wherein said flange members on said first leg members have two fastener receiving apertures therethrough in alignment with said support on each of said first legs.

5. The rack of claim 1 wherein said first support member is a rod, and said means secured to said collector is an arcuate clamp member selectively rotatably mounted to said first support member and has an extended portion for connection to the upper end of a collector.

6. The rack of claim 5 wherein said second support member comprises a second elongated rod parallel to said rod of said first assembly, and said means secured to said collector is a second arcuate clamp member selectively rotatably mounted to said second elongated rod, said second clamp member having an extended portion adapted for connection to the lower end of a solar collector.

7. The rack of claim 1 wherein said second support member is an elongated rod member, said means secured to said collector is a clamp member selectively rotatably mounted to said rod member and having an extended portion for connection to the lower end of the solar collector.

8. The rack of claim 1 wherein said flange members have four symmetrically disposed fastener receiving apertures about each leg.

9. In combination with a solar collector and a support surface therefor, a rack for mounting the collector at an angle to the horizontal to receive solar radiation, said rack comprising first and second independent support assemblies, said first support assembly having a first pair of spaced apart leg members with a first support member extending between the upper ends thereof, said leg members having flange members rigidly connected on the lower ends therefor for attaching said leg members to the support surface essentially perpendicular thereto and in fixed relation therewith, said leg members including means for varying the length thereof, said second support assembly comprising a second elongated support member, means on the second support member for attaching said support assembly to said support surface with the attachment means thereof essentially perpendicular to the support surface and in fixed relation therewith, said second support assembly providing a convex surface to provide attachment of a collector thereto at a selected angular position, means for attaching the lower end of a collector to said convex surface at a selected angular relation, and means secured to said collector adjacent the upper ends thereof and rotatably connected to said first support member.

10. The rack of claim 9, wherein said second assembly comprises a member having spaced apart flanges for attachment to the support surface and said convex surface is therebetween.

* * * * *